US010971005B1

(12) United States Patent
Adireddy et al.

(10) Patent No.: US 10,971,005 B1
(45) Date of Patent: Apr. 6, 2021

(54) DETERMINING I2X TRAFFIC-PARTICIPANT CRITICALITY

(71) Applicant: Continental Automotive Systems, Inc., Auburn Hills, MI (US)

(72) Inventors: Ganesh Adireddy, Bloomfield Hills, MI (US); Andrew Phillip Bolduc, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/727,802

(22) Filed: Dec. 26, 2019

(51) Int. Cl.
| | |
|---|---|
| *G08G 1/09* | (2006.01) |
| *G08G 1/005* | (2006.01) |
| *B60Q 9/00* | (2006.01) |
| *G08G 1/07* | (2006.01) |
| *B60Q 5/00* | (2006.01) |
| *G08G 1/16* | (2006.01) |

(52) U.S. Cl.
CPC ............ *G08G 1/091* (2013.01); *B60Q 5/006* (2013.01); *B60Q 9/008* (2013.01); *G08G 1/005* (2013.01); *G08G 1/07* (2013.01); *G08G 1/166* (2013.01)

(58) Field of Classification Search
CPC .......... G08G 1/091; G08G 1/07; G08G 1/005; G08G 1/166; G08G 1/0133; G08G 1/0145; G08G 1/01–012; G08G 1/164; B60Q 9/008; B60Q 5/006
See application file for complete search history.

(56) References Cited

U.S. PATENT DOCUMENTS

| | | | |
|---|---|---|---|
| 8,903,640 B2 | 12/2014 | Caminiti et al. | |
| 9,349,291 B2* | 5/2016 | Goudy | G08G 1/164 |
| 9,368,028 B2 | 6/2016 | Lord et al. | |
| 9,487,139 B1* | 11/2016 | Ishida | B60W 30/08 |
| 9,715,711 B1* | 7/2017 | Konrardy | G01S 19/48 |
| 10,235,882 B1 | 3/2019 | Aoude et al. | |
| 10,636,308 B2* | 4/2020 | Glatfelter | G08G 1/164 |

(Continued)

FOREIGN PATENT DOCUMENTS

| | | |
|---|---|---|
| CN | 108230676 A | 6/2018 |
| DE | 102015214986 A1 | 2/2017 |
| WO | 2019084775 A1 | 5/2019 |

OTHER PUBLICATIONS

Akio Hosaka et al., "Improvement of Traffic Safety by Road-Vehicle Cooperative Smart Cruise Systems", IATSS Research, vol. 24, No. 2, 2000, Science Direct, Received on Jul. 26, 2000.

*Primary Examiner* — Ryan W Sherwin

(57) ABSTRACT

For each pair of traffic participants (TPs) entering an intersection, a time to collision (TTC) value is calculated. A matrix of TTC values between TPs entering the intersection is created. A matrix of criticality values containing a respective criticality value for each pair of TPs is created. Each criticality value is determined as a function of both TTC and at least one additional weighting factor. A basic safety message (BSM) and/or a pedestrian safety message (PSM) is broadcast on behalf of at least one traffic participant based on having determined the criticality for each pair of traffic participants and having identified a near-miss and/or a potential-collision situation between traffic participants based on the respective criticality values in the matrix of criticality values. One or more warnings are provided to a pedestrian, a driver of a vehicle, and/or a cyclist based on the broadcasted BSM and/or PSM.

16 Claims, 2 Drawing Sheets

(56) References Cited

U.S. PATENT DOCUMENTS

| | | | |
|---|---|---|---|
| 2011/0298603 A1* | 12/2011 | King | G08G 1/042 340/436 |
| 2012/0010762 A1* | 1/2012 | Asano | G08G 1/166 701/1 |
| 2012/0116663 A1 | 5/2012 | Tsunekawa | |
| 2014/0288816 A1* | 9/2014 | Hayasaka | B60W 10/18 701/301 |
| 2014/0303882 A1 | 10/2014 | Jang et al. | |
| 2015/0266473 A1* | 9/2015 | Hayasaka | G08G 1/166 701/70 |
| 2016/0328963 A1* | 11/2016 | Yao | H04W 4/80 |
| 2017/0039865 A1* | 2/2017 | Takabayashi | G08G 1/167 |
| 2017/0080857 A1* | 3/2017 | Herman | G01S 7/51 |
| 2017/0186318 A1* | 6/2017 | Murayama | G08G 1/16 |
| 2018/0038689 A1* | 2/2018 | Takemura | G06K 9/4642 |
| 2018/0047284 A1* | 2/2018 | Narasimha | G08G 1/092 |
| 2018/0151076 A1* | 5/2018 | Hirotsu | G08G 1/166 |
| 2018/0204450 A1* | 7/2018 | Song | G08G 1/166 |
| 2018/0231974 A1* | 8/2018 | Eggert | B60W 50/0097 |
| 2018/0265083 A1* | 9/2018 | Morotomi | B60W 30/18154 |
| 2019/0096255 A1* | 3/2019 | Mills | G01S 17/00 |
| 2019/0138524 A1* | 5/2019 | Singh | H04L 43/18 |
| 2019/0164430 A1* | 5/2019 | Nix | G08G 1/163 |
| 2019/0333370 A1* | 10/2019 | Malkes | G06T 7/70 |
| 2019/0366925 A1* | 12/2019 | Yoshihara | G08G 1/166 |
| 2019/0382035 A1* | 12/2019 | Li | G06K 9/00671 |
| 2020/0055517 A1* | 2/2020 | Kim | B60W 30/09 |
| 2020/0090518 A1* | 3/2020 | Sano | G08G 1/166 |
| 2020/0349842 A1* | 11/2020 | Radha | G08G 1/0112 |
| 2020/0349843 A1* | 11/2020 | Liu | G08G 1/005 |
| 2020/0353904 A1* | 11/2020 | Lee | G01S 13/931 |

* cited by examiner

| TTC (s) | V1 | V2 | V3 | P1 | P2 | P3 |
|---|---|---|---|---|---|---|
| V1 | - | 2 | 4 | - | 3 | - |
| V2 | 2 | - | 3 | - | - | - |
| V3 | 4 | 3 | - | - | - | 5 |

| CRITICALITY (%) | V1 | V2 | V3 | P1 | P2 | P3 |
|---|---|---|---|---|---|---|
| V1 | 0 | 80 | 60 | 0 | 70 | 0 |
| V2 | 80 | 0 | 70 | 0 | 0 | 0 |
| V3 | 60 | 70 | 0 | 0 | 0 | 50 |

FIG. 3

| CRITICALITY (%) | V1 | V2 | V3 | P1 | P2 | P3 |
|---|---|---|---|---|---|---|
| V1 | 0 | 90 | 70 | 0 | 80 | 0 |
| V2 | 90 | 0 | 70 | 0 | 0 | 0 |
| V3 | 70 | 70 | 0 | 0 | 0 | 50 |

FIG. 4

| CRITICALITY (%) | V1 | V2 | V3 | P1 | P2 | P3 |
|---|---|---|---|---|---|---|
| V1 | 0 | 90 | 70 | 0 | 95 | 0 |
| V2 | 90 | 0 | 70 | 0 | 0 | 0 |
| V3 | 70 | 70 | 0 | 0 | 0 | 65 |

FIG. 5

DETERMINING I2X TRAFFIC-PARTICIPANT CRITICALITY

BACKGROUND

Embodiments of the invention relate to determining the criticality of traffic participants to identify potential collision situations between traffic participants at an intersection.

As is known in the art, an intelligent intersection may increase safety of intersections through sensor-based object detection. The sensors may be mounted on road-side units, which may also referred to as infrastructure. Dedicated Short-Range Communication (DSRC) links infrastructure road-side units and vehicles and other traffic participants to protect against collisions with vulnerable road users (e.g., pedestrians and cyclists) and other traffic participants.

The road-side units may use various technologies including radar, camera, access to cloud-based servers, and Infrastructure-to-Everything (I2X) communication, which may include Infrastructure-2-Vehicle communication (I2V) communication, Infrastructure-2-Infrastructure (I2I) communication, Infrastructure-2-Pedestrian (I2P) communication, and the like, based on DSRC.

As is known in the art, road-side units, on-board vehicle units, and communication units of other traffic participants may include a DSRC, or other type of wireless, transceiver, which may include a processor, a memory, a communication interface, and an antenna assembly for enabling wireless communication.

Improved techniques for determining the criticality of traffic participants to identify and capture near miss/potential collision situations between traffic participants and finding critical traffic participants on behalf of which BSM (basic safety message)/PSM (pedestrian safety message) may be broadcasted would advance the state of the art.

BRIEF SUMMARY

In accordance with embodiments of the invention, for each pair of traffic participants (TPs) entering an intersection, a time to collision (TTC) value is calculated. A matrix of TTC values between TPs entering the intersection is created. A matrix of criticality values containing a respective criticality value for each pair of TPs is created. Each criticality value is determined as a function of both TTC and at least one additional weighting factor. A basic safety message (BSM) and/or a pedestrian safety message (PSM) is broadcast on behalf of at least one traffic participant based on having determined the criticality for each pair of traffic participants and having identified a near-miss and/or a potential-collision situation between traffic participants based on the respective criticality values in the matrix of criticality values. One or more warnings are provided to a pedestrian, a driver of a vehicle, and/or a cyclist based on the broadcasted BSM and/or PSM.

BRIEF DESCRIPTION OF THE DRAWINGS

FIG. 3 depicts a matrix of criticality values for traffic participants based on time-to-collision estimates in accordance with embodiments of the invention.

FIG. 4 depicts a matrix of criticality values for traffic participants based on time-to-collision estimates and whether a potential collision is predicted to happen in a high-conflict zone within an intersection in accordance with embodiments of the invention.

FIG. 5 depicts a matrix of criticality values for traffic participants based on time-to-collision estimates, whether potential collisions are predicted to happen in a high-conflict zone within an intersection, and whether the potential collisions involve a vehicle and a pedestrian, in accordance with embodiments of the invention.

DETAILED DESCRIPTION

Figures 1, 2:
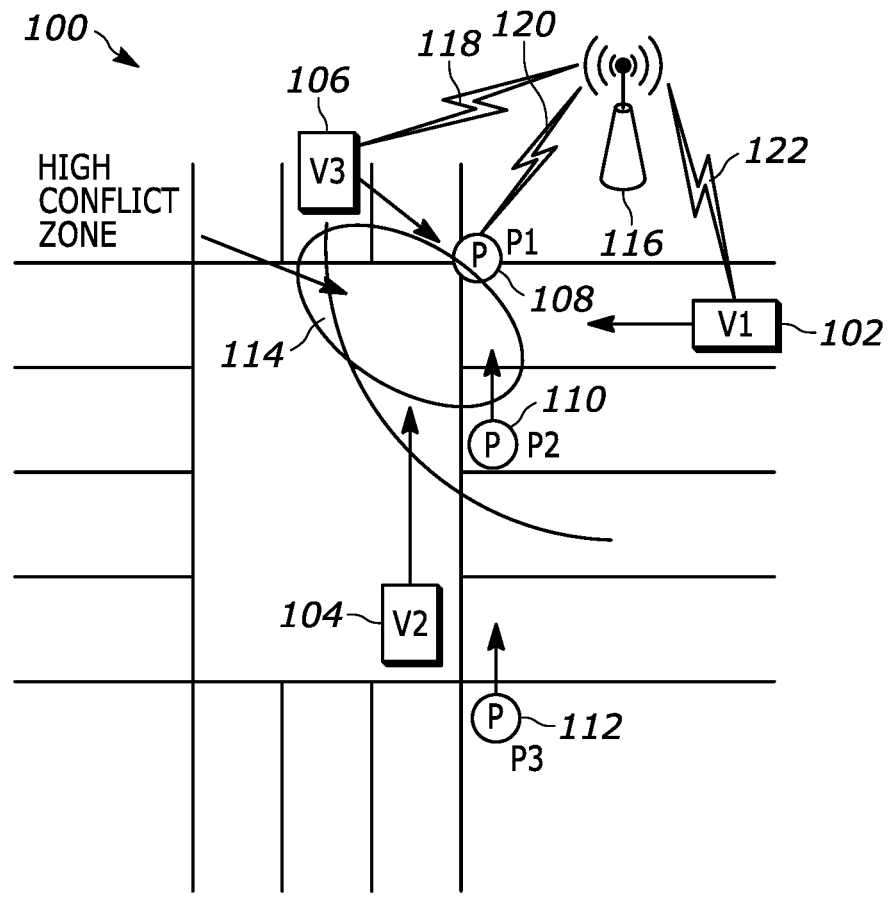
FIG. 1 depicts an intersection with three vehicles, three pedestrians, a high-conflict zone, and a road-side unit.
FIG. 2 depicts example values for the TPs shown in FIG. 1.

With intelligent intersections/infrastructure installed with sensors, various types of traffic participants (e.g., vehicle, pedestrians, bicycle, and motorcycles) at or near an intersection can be detected by those sensors. The detection of traffic participants by the sensors may capture the positions and motion attributes of the traffic participants in and approaching the intersection.

The respective positions of TPs (traffic participants) may be estimated over a short duration of time and TTC (time to collision) between different TPs, specifically vehicle-vehicle and vehicle-pedestrian TTCs, may be calculated, as is known in the art.

A mapping matrix of TTC between TPs in and approaching an intersection may be created. For each pair of TPs, criticality may be defined as a function of TTC, with additional weighting factors. The weighting factors may include one or more of the following types.

Weights may be based on a type of traffic participant. For example, a potential collision between a pedestrian and vehicle holds more weight than a potential collision between two vehicles because the pedestrian is much more vulnerable, than a vehicle, to serious injury or death in a collision with a vehicle. On the other hand, a potential collision between two pedestrians may have a lower weight, which may approach or equal 0, as a pedestrian-pedestrian collision is not critical.

Weights may be based on where a TP is located. In a potential collision between a vehicle and a pedestrian, if the pedestrian is on a crosswalk crossing the street, this carries more weight than in the case of a potential vehicle-pedestrian collision when the pedestrian is close to or on the sidewalk.

A higher weight may be applied if the potential collision may occur in a high-conflict zone or near-miss area of the intersection. Such information can be extracted from a conflict-zone-heat map. Safety heat maps of this type for intersections are known in the art.

A higher weighting is applied when one of the TPs does not have the right of way, but that TP, without the right of way, is moving.

FIG. 1 depicts an intersection 100 with three vehicles V1 102, V2 104, and V3 106, three pedestrians P1 108, P2 110, and P3 112, a high-conflict zone 114, and a road-side unit 116, which is in wireless communication with the vehicles and vulnerable road user (VRU) devices (not shown) associated with the three pedestrians. The VRU devices may be any suitable type of mobile communication device, including, but not limited to a smartphone, a smart watch, a wearable fitness monitor, and the like. The wireless communication is depicted in FIG. 1 via 118, 120, and 122. But wireless communication between the roadside unit 116 and V2, P2, and P3 is not depicted in FIG. 1 to keep FIG. 1 uncluttered. In the example of FIG. 1, V1 is moving fast with no right of way. V2 is moving fast, with the right of way. And V3 is making a left turn. In this example, moving fast may refer to travelling over a predetermined speed. Such a predetermined speed may be any suitable speed, such as 15, 20, 25, 30 miles per hour, for example, depending on factors such as the types of roads at the intersection, traffic conditions, and the like. In the example of FIG. 1, P1 is waiting on the side walk, and P2 and P3 are walking in the crosswalk.

From the position estimates of the TPs and their velocities, a matrix of Time to collision (TTC) estimates can be generated in accordance with embodiments of the invention.

FIG. 2 depicts example values for the TPs shown in FIG. 1. TTC values may be estimated based on the positions, velocities, and the like in various ways, which are known in the art. In the example, V1 and V2 are assigned an estimated TTC value of 2 seconds. Both the pair V2 and V3 and the pair V1 and P2 are assigned an estimated TTC value of 3 seconds. V1 and V3 are assigned an estimated TTC value of 4 seconds. And V3 and P3 are assigned an estimated TTC of 5 seconds.

FIG. 3 depicts a matrix of criticality values for traffic participants based on time-to-collision estimates in accordance with embodiments of the invention. Relatively Lower TTC values result in relatively higher criticality values, (i.e., relatively more weight) for the interaction between any particular pair of TPs. For example, TTC values of 2 seconds in FIG. 2 are assigned criticality values of 80% in FIG. 3. Similarly, TTC values of 3 seconds in FIG. 2 are assigned criticality values of 70% in FIG. 3. TTC values of 4 seconds in FIG. 2 are assigned criticality values of 60% in FIG. 3. And, the TTC value of 5 seconds in FIG. 2 is assigned a criticality value of 50% in FIG. 3.

FIG. 4 depicts a matrix of criticality values for traffic participants based on time-to-collision estimates and whether a potential collision is predicted to happen in a high-conflict zone within an intersection in accordance with embodiments of the invention. Referring to FIG. 1, a potential collision between V1 and V2 may occur in the high conflict zone shown in FIG. 1. The criticality of 80% shown in FIG. 3 for a potential collision between V1 and V2, is increased to 90% in FIG. 4 because such a potential collision between these two vehicles may occur in the high conflict zone.

Similarly, a potential collision between V1 and V3 is predicted to occur in the high conflict zone. The criticality of 60% shown in FIG. 3 for a potential collision between V1 and V3, is therefore increased to 70% in FIG. 4 because such a potential collision between these two vehicles may occur in the high conflict zone.

Further, a potential collision between V1 and P2 is predicted to occur in the high conflict zone. The criticality of 70% shown in FIG. 3 for a potential collision between V1 and P2, is therefore increased to 80% in FIG. 4 because such a potential collision between these two traffic participants may occur in the high conflict zone.

FIG. 5 depicts a matrix of criticality values for traffic participants based on time-to-collision estimates, whether potential collisions are predicted to happen in a high-conflict zone within an intersection, and whether the potential collisions involve a vehicle and a pedestrian, in accordance with embodiments of the invention. For example, a potential collision between V1 and P2 would be a collision between a vehicle and a pedestrian. The criticality of 80% shown in FIG. 4 for a potential collision between V1 and P2, is therefore increased to 95% in FIG. 5 because such a potential collision would involve a vehicle and a pedestrian.

Similarly, a potential collision between V3 and P3 would be a collision between a vehicle and a pedestrian. The criticality of 50% shown in FIG. 4 for a potential collision between V3 and P3, is therefore increased to 65% in FIG. 5 because such a potential collision would involve a vehicle and a pedestrian.

The criticality values and weights mentioned above, namely, the criticality values assigned based on the estimated TTC values, the 10% increase because a potential collision may occur in a high-conflict zone within an intersection, and the 15% increase because a potential collision would include a vehicle and a pedestrian, are just examples, are not meant to be limiting, and other suitable ciriticality values and added weights may also be used.

In accordance with other embodiments of the invention, other rules may be added for generating different criticality-percentage matrixes. For example, potential collisions between vehicles and other types of vulnerable traffic participants, such as cyclists may also be used to adjust weights according to any suitable rule for generating a criticality-percentage matrix, in a manner similar to that discussed above. Rules may also be included to account for excessive speed, unsafe lane changes, wrong-way driving, tailgating, darkness, traffic density, inclement weather, rain, ice, snow, low temperature, fog, street racing, or any other suitable factor correlated with increased occurrence of accidents.

Once a road-side unit has determined the criticality of traffic participants and identified near miss/potential collision situations between traffic participants based on the criticality determinations described above, the roadside unit may broadcast a BSM (basic safety message)/PSM (pedestrian safety message) on behalf of the critical traffic participants, which may result in one or more audio and/or visual warnings being presented to pedestrians, drivers of vehicles, cyclists, and the like. BSM/PSM messages and audio/visual warnings are known in the art.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method comprising:
for each pair of traffic participants (TPs) entering an intersection, calculating a time to collision (TTC) value;
creating a matrix of TTC values between TPs entering the intersection;
creating a matrix of criticality values containing a respective criticality value for each pair of TPs, wherein each criticality value is determined as a function of both TTC and at least one additional weighting factor;
broadcasting at least one of a basic safety message (BSM) and a pedestrian safety message (PSM) on behalf of at least one traffic participant based on having determined the criticality for each pair of traffic participants and having identified at least one of a near-miss situation and a potential-collision situation between traffic participants based on the respective criticality values in the matrix of criticality values for the pairs of TPs; and providing one or more warnings to at least one of a pedestrian, a driver of a vehicle, and a cyclist based on the broadcasted at least one of a BSM and a PSM.

2. The method of claim 1, wherein relatively lower TTC values result in relatively higher criticality values for each of the pairs of TPs.

3. The method of claim 2, wherein a potential collision between a vehicle and a vulnerable TP results in a higher criticality value than a potential collision between two vehicles.

4. The method of claim 3, wherein the vulnerable TP includes at least one of a pedestrian and a cyclist.

5. The method of claim 2, wherein, for a potential collision between a vehicle and a pedestrian, the pedestrian being on a crosswalk crossing the street results in a higher criticality value than when the pedestrian is at least one of close to the sidewalk or on the sidewalk.

6. The method of claim 2, wherein the potential collision being predicted to happen in at least one of a high-conflict zone of the intersection and a near-miss area of the intersection results in a higher criticality value than when the potential collision is predicted to happen outside the high-conflict zone of the intersection and outside the near-miss area of the intersection.

7. The method of claim 6, wherein an existence and a location of at least one of the high-conflict zone of the intersection and the near-miss area of the intersection are read from a stored conflict-zone-heat map.

8. The method of claim 2, wherein the potential collision involving a TP that does not have the right of way and that is moving without the right of way results in a higher criticality value than when the potential collision involves no TP that does not have the right of way and that is moving without the right of way.

9. An apparatus configured to perform operations comprising:
   for each pair of traffic participants (TPs) entering an intersection, calculating a time to collision (TTC) value;
   creating a matrix of TTC values between TPs entering the intersection;
   creating a matrix of criticality values containing a respective criticality value for each pair of TPs, wherein each criticality value is determined as a function of both TTC and at least one additional weighting factor;
   broadcasting at least one of a basic safety message (BSM) and a pedestrian safety message (PSM) on behalf of at least one traffic participant based on having determined the criticality for each pair of traffic participants and having identified at least one of a near-miss situation and a potential-collision situation between traffic participants based on the respective criticality values in the matrix of criticality values for the pairs of TPs; and
   providing one or more warnings to at least one of a pedestrian, a driver of a vehicle, and a cyclist based on the broadcasted at least one of a BSM and a PSM.

10. The apparatus of claim 9, wherein relatively lower TTC values result in relatively higher criticality values for each of the pairs of TPs.

11. The apparatus of claim 10, wherein a potential collision between a vehicle and a vulnerable TP results in a higher criticality value than a potential collision between two vehicles.

12. The apparatus of claim 11, wherein the vulnerable TP includes at least one of a pedestrian and a cyclist.

13. The apparatus of claim 10, wherein, for a potential collision between a vehicle and a pedestrian, the pedestrian being on a crosswalk crossing the street results in a higher criticality value than when the pedestrian is at least one of close to the sidewalk or on the sidewalk.

14. The apparatus of claim 10, wherein the potential collision being predicted to happen in at least one of a high-conflict zone of the intersection and a near-miss area of the intersection results in a higher criticality value than when the potential collision is predicted to happen outside the high-conflict zone of the intersection and outside the near-miss area of the intersection.

15. The apparatus of claim 14, wherein an existence and a location of at least one of the high-conflict zone of the intersection and the near-miss area of the intersection are read from a stored conflict-zone-heat map.

16. The apparatus of claim 10, wherein the potential collision involving a TP that does not have the right of way and that is moving without the right of way results in a higher criticality value than when the potential collision involves no TP that does not have the right of way and that is moving without the right of way.

* * * * *